P. J. MARKS.
PHOTOGRAPHIC SHUTTER.
APPLICATION FILED OCT. 27, 1919.
1,422,460.
Patented July 11, 1922.
5 SHEETS—SHEET 1.
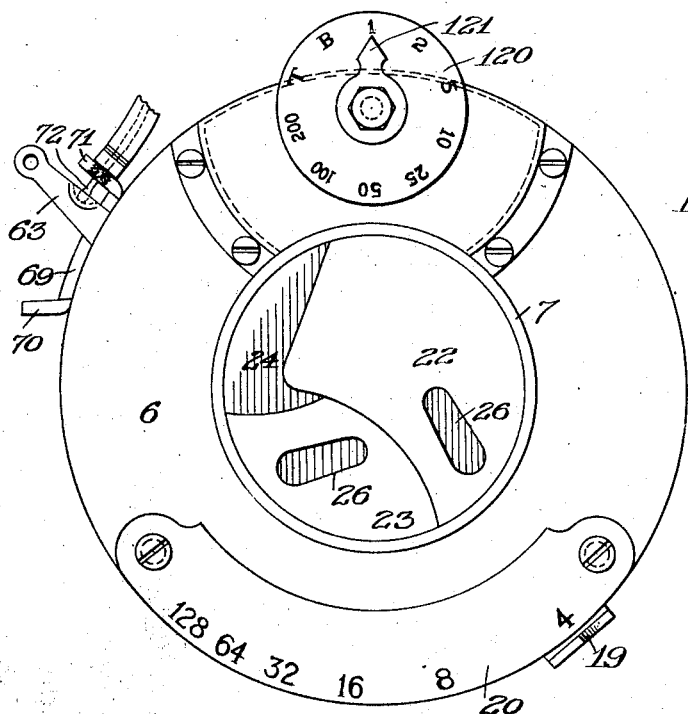
Fig. 1
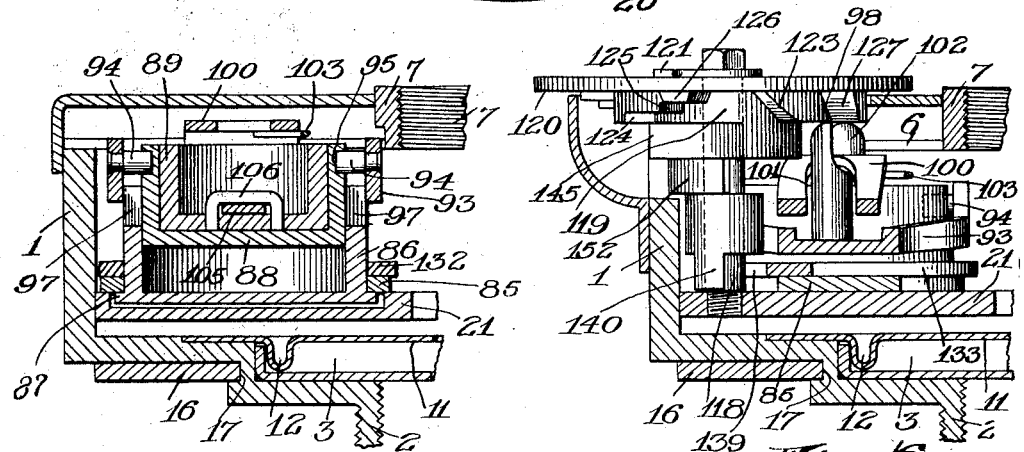
Fig. 15
Fig. 16
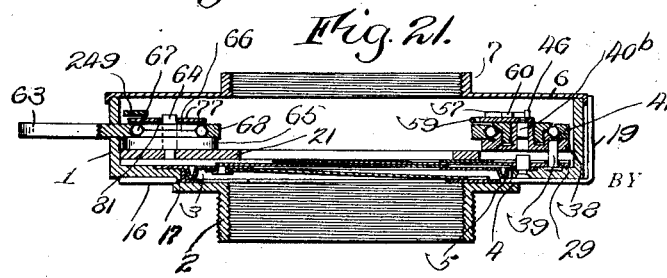
Fig. 21.
INVENTOR
Paul J. Marks
BY
Nelson A. Hallauer
ATTORNEY

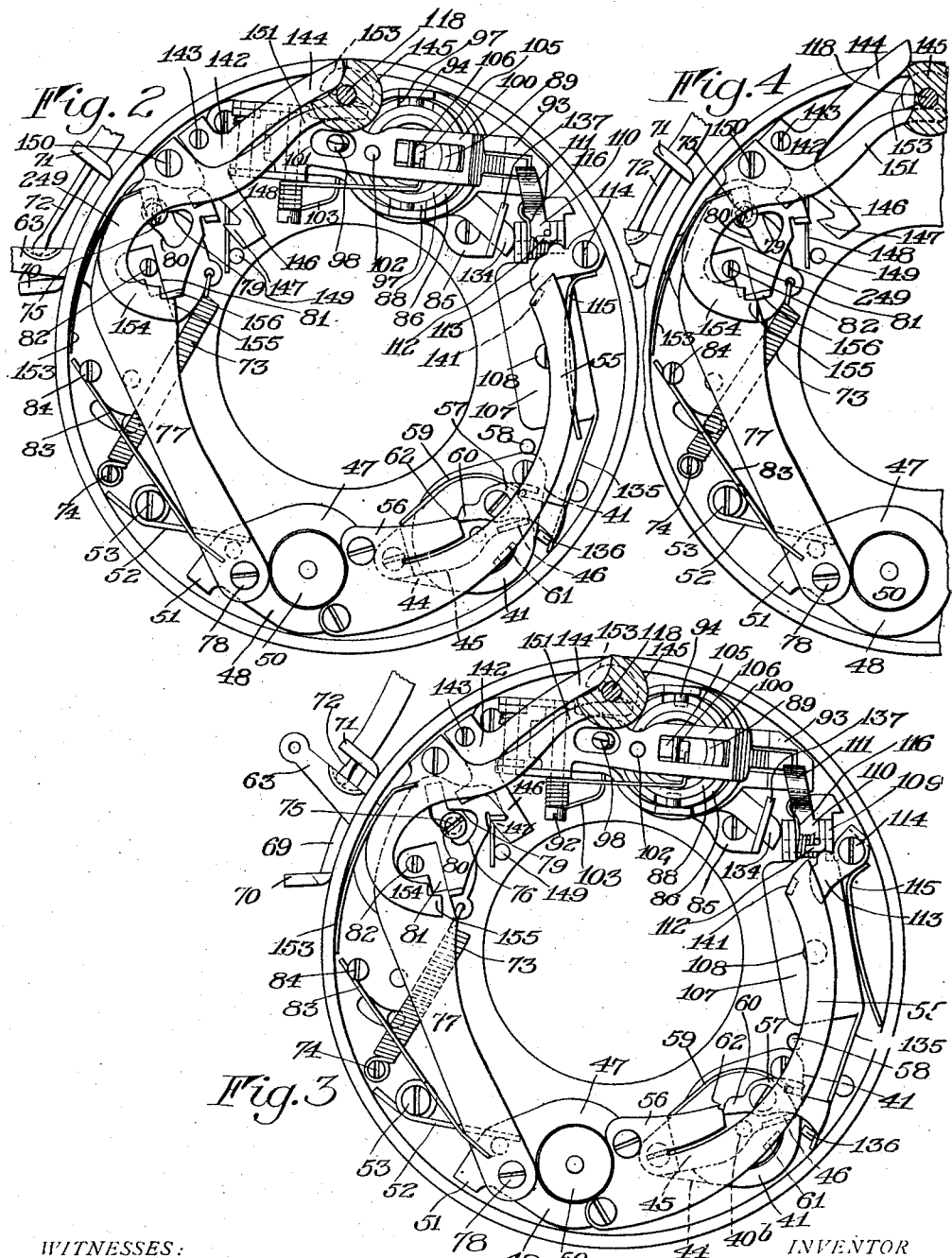

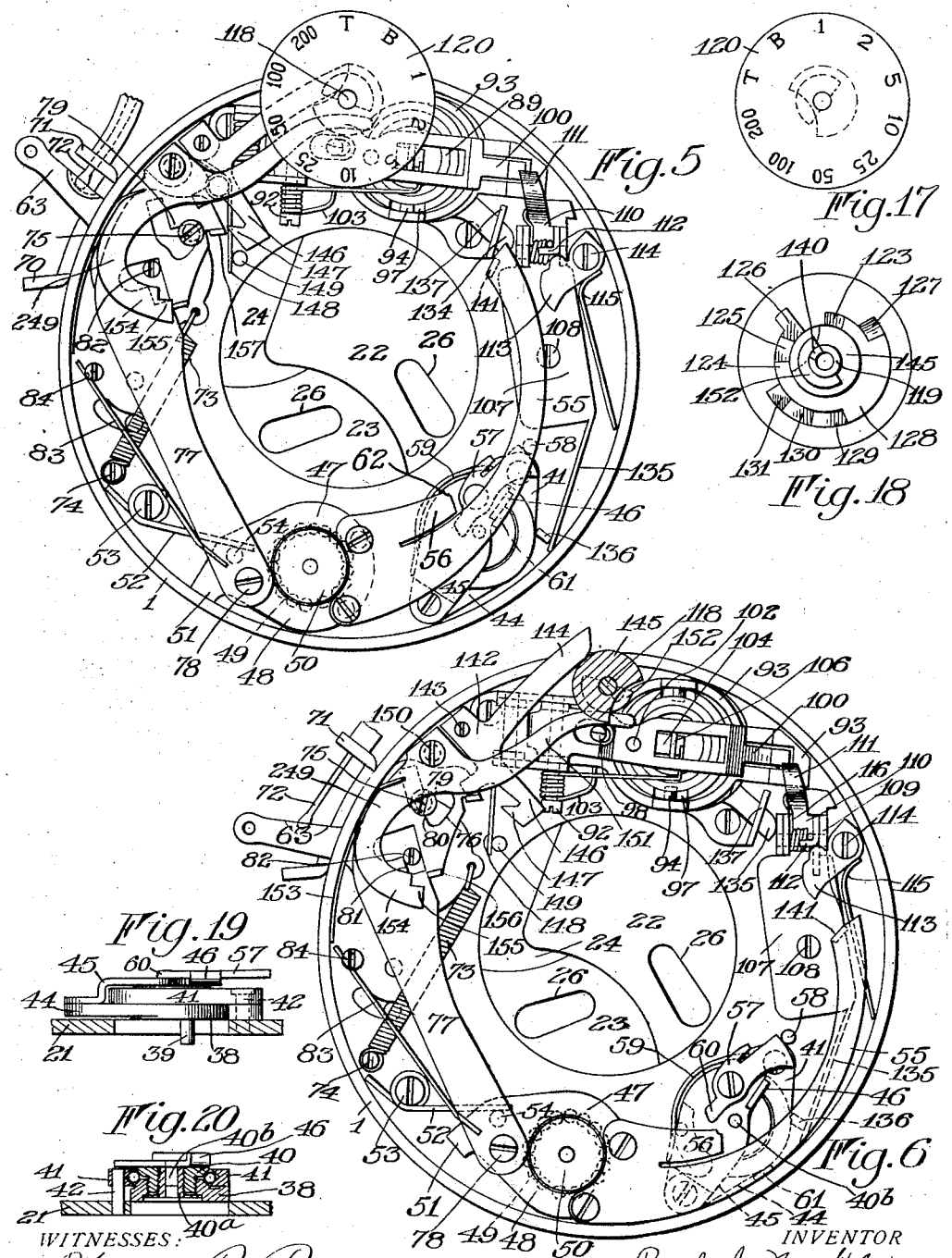

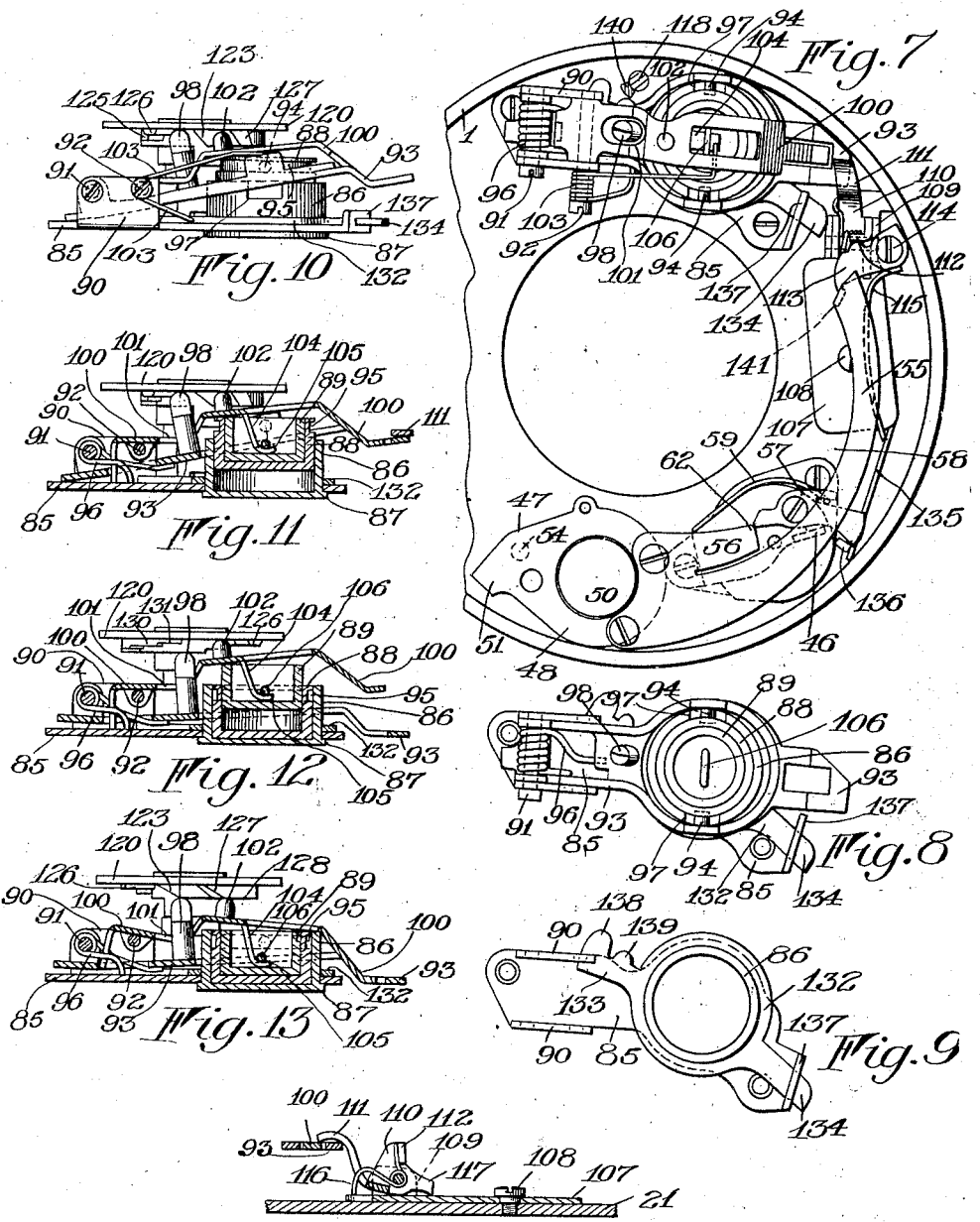

P. J. MARKS.
PHOTOGRAPHIC SHUTTER.
APPLICATION FILED OCT. 27, 1919.

1,422,460.

Patented July 11, 1922.
5 SHEETS—SHEET 5.

WITNESSES:
Walter D. Payne

INVENTOR
Paul J. Marks,
BY Nelson A. Hallauer
his ATTORNEY

UNITED STATES PATENT OFFICE.

PAUL J. MARKS, OF ROCHESTER, NEW YORK.

PHOTOGRAPHIC SHUTTER.

1,422,460.          Specification of Letters Patent.          Patented July 11, 1922.

Application filed October 27, 1919. Serial No. 333,838.

*To all whom it may concern:*

Be it known that I, PAUL J. MARKS, a citizen of the United States, residing at Rochester, in the county of Monroe, State of New York, have invented certain new and useful Improvements in Photographic Shutters, and I do declare the following to be a full, clear, and exact description of the same, reference being had to the accompanying drawings, forming a part of this specification.

My invention relates to photographic shutters of the kind used with cameras or other photographic instruments and has for its object to provide a shutter which is simple in construction and operation, automatic in action, not liable to get out of order when in use and more efficient than photographic shutters heretofore constructed. A further object of my invention is to provide a shutter having a casing which is light and strong, and which is strengthened by the diaphragm operating devices. Another object of my invention is to provide a shutter having an improved blade by means of which a greater volume of light may be admitted during a given interval of time making possible the full exposure of a photographic plate or film in a much shorter interval of time than heretofore. More specifically it is the object of my invention to provide a shutter with blades so constructed that light will be admitted simultaneously from the center and outer margin of the opening during the opening and closing movements of the blades. Another object of my invention is to provide a pivoted blade shutter in which the blades are constructed of thin material connected by devices of thin flexible material to avoid shock and rebound and serving as auxiliary blades to shut out the light at the weak points when the shutter is closed thus enabling me to employ narrow blades making possible the construction of a light shutter of a high degree of efficiency for use on small cameras, having a small diameter without reducing the lens aperture, the auxiliary blades operating out of full surface contact with the primary blades to reduce surface friction. A further object of my invention is to mount the principal moving parts of a shutter on ball bearings to reduce friction and render high speed possible. Another object of my invention is to provide a photographic shutter with improved retarding devices whereby accurately timed automatic exposures may be secured from the shortest fraction of a second to an automatically timed exposure of several seconds duration. More specifically, I provide a retarder for a shutter which may be assembled as a unit and which comprises a plurality of dashpots or a dashpot and a combined piston and dashpot, both dashpots operating for the longer automatic exposures while the movements for the shorter exposures are selected from the longest range of movement required for the longest exposure. A still further object of my invention is to provide a retarder for photographic shutters of the cylinder and piston type on which the axis of the cylinder is mounted in a position substantially parallel with the axis of the lens and which is therefore uniform in action in all positions in which the camera may be used. A still further object of my invention is to provide a photographic shutter having a revoluble dial for controlling the various speeds and which is at all times free to be turned in either direction without liability of breaking the parts or getting the shutter out of order. A still further object of my invention is to so construct the mechanism of a shutter that the trigger will be completely returned to its normal position of rest when the blades are open for a time exposure thus overcoming the danger of displacing the cable release, which loosely engages in a socket in the trigger. To these and other ends my invention resides in certain improvements, combinations and arrangement of parts all as hereinafter more fully described and particularly pointed out in the appended claims.

In the drawings:—

Figure 1 is a front elevation of a photographic shutter constructed according to the principles of my invention, Figure 2 is a front elevation of the same with the cover removed to expose the parts and showing the blades open with the setting devices set for a time exposure.

Figure 3 is a view similar to Fig. 2 showing the position of the parts after the trigger has been released, Figure 4 is a view similar to Fig. 2 with parts broken away, and showing the position of the parts when the setting devices are set for bulb exposures and the blades in open position, Figure 5 is a view similar to Fig. 2 but showing the blades in closed position, Figure 6 is a similar view with the setting devices set for an automatic exposure of one tenth of a second, Figure 7 is a view of the casing partly broken away showing the retarding devices in position therein and the setting devices set for an automatic exposure of one second.

Figure 8 is a plan view of the retarding devices removed from the casing,

Figure 9 is plan view of the same, parts being removed,

Figure 10 is a side elevation of the retarding devices with the parts adjusted for an automatic exposure of one second, Figure 11 is a central vertical section of the retarding devices as seen in Fig. 10, Figure 12 is a view similar to Fig. 11 with the parts adjusted for an automatic exposure of one-tenth of a second.

Figure 13 is a similar view showing the parts adjusted for an automatic exposure of the shortest duration of which the shutter is capable;

Figure 22:
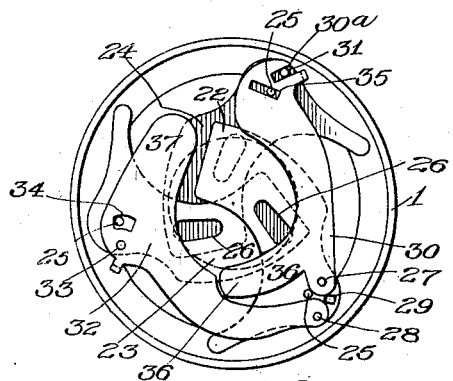
Figure 23:
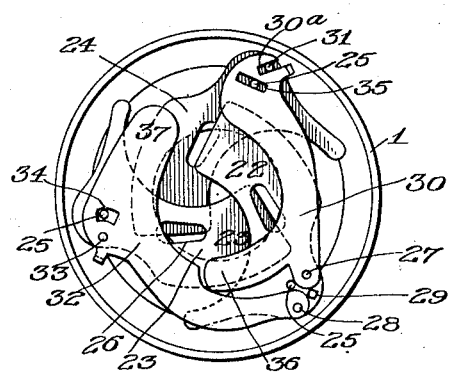
Figure 24:
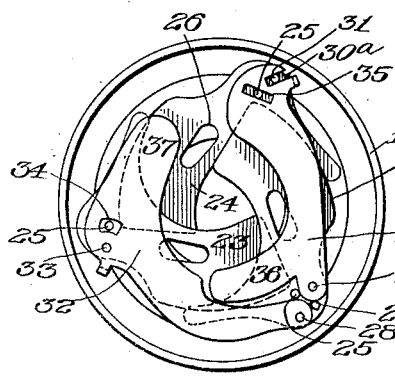
Figure 25:
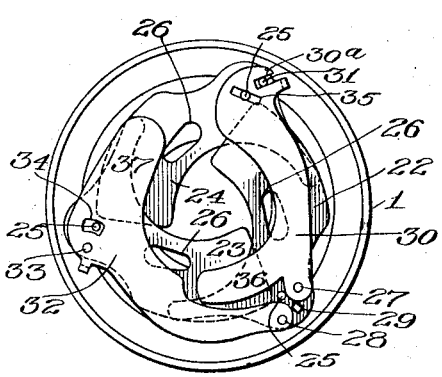
Figures 26, 28:
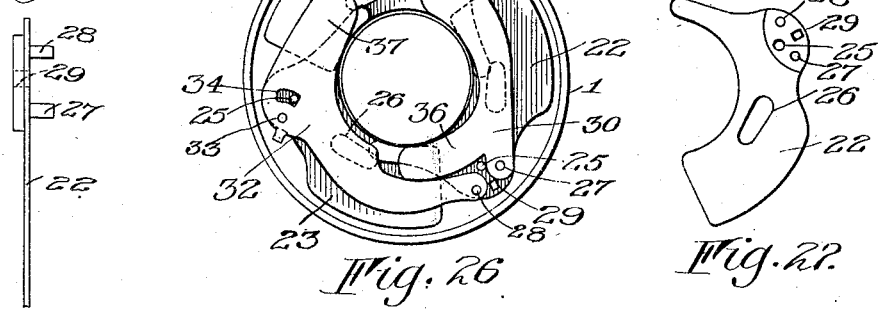
Figure 27:
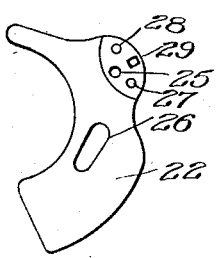

Figure 14 is a vertical section of a lever cooperating with the retarding devices, Figure 15 is an enlarged sectional view through the cylinders of the retarding devices, Figure 16 is an enlarged view of the setting and cooperating devices, parts thereof being shown in section, Figure 17 is a plan view of the setting dial removed, Figure 18 is an inverted plan view thereof, Figures 19 and 20 are sections of details showing the mounting of the blade operating member, Figure 21 is a section through the shutter casing showing the mountings of the trigger, and the blade operating device, Figure 22 is a view of the shutter with parts removed to show the blades and connecting parts, the blades being shown in closed position, Figure 23 is a similar view showing the blades after the initial opening movement, Figures 24, 25 and 26 are similar views showing further movements of the blades to the full open position, Figures 27 and 28 are details of the blade construction.

My improved shutter comprises a casing 1 of metal or other suitable material from the rear side of which projects the lens barrel 2 having internal screw threads adapted to receive the rear combination of a lens. The barrel 2 is also externally threaded to cooperate with that part of the camera to which it is secured. Adjacent the barrel 2 the casing is provided with a recess 3 best seen in Fig. 21 of the drawings in which the iris diaphragm and connected parts are housed. At the rear side of the recess 3 the casing is slotted as at 4 and an inwardly and upwardly projecting lug 5 on the diaphragm operating member projects through this slot to cooperate with the diaphragm ring. Forwardly of the recess 3, the casing is enlarged to house the operating mechanism of the shutter. The front of the shutter is closed by means of a cover plate 6 suitably secured in position and provided with an internally threaded lens barrel 7.

A ring 16 is seated in a groove 17 provided therefor in the outer wall of the casing and provided with the projection or lug 5 which extends through a slot in the casing wall beneath the ring and engages the diaphragm ring. The ring 16 is provided with a pointer 19 which is bent up adjacent the outer periphery of the casing and cooperates with a scale 20 secured to, or formed on, the front wall of the cover as shown in Fig. 1. The scale is provided with the usual numerals 4, 8, 16 etc. to indicate the diaphragm openings the well known "U. S." system or in terms of the focal length of the lens.

Suitably secured in the casing is a plate or partition 21 having an aperture concentric with the diaphragm opening and which serves as a support for the shutter operating devices. The shutter blades of which there are three in number indicated by the reference numerals 22, 23 and 24 are pivoted to the rear casing wall and operate between the ring 11 and the rear face of the partition 21. I show three blades in the present instance athough it is to be understood that a greater or less number may be used without departing from the spirit or scope of my invention. The blades 22, 23 and 24 which we will designate as primary blades are connected to operate simultaneously by means which serve to cooperate with the primary blades to completely close the aperture when the blades are in closed position. Said means are hereinafter more fully described, and effectively prevents the reflection of light about the edges of the blades.

Each of the blades 22, 23 and 24 is of novel construction and one is shown in detail in Fig. 33 of the drawings. The blades are made of thin material of the form shown in Fig. 33, and pivoted to the casing to turn about the points 25 which are placed equidistantly from each other. When the shutter is closed the blades occupy the positions shown in Fig. 28 of the drawings, and successive opening positions are shown in Figs. 29, 30, 31 and 32 the last figure showing the blades in the fully open position. I have so constructed the blades that in the opening and closing movements light will be admitted simultaneously from the center and periphery of the aperture as clearly shown in Figs. 29, 30 and 31. For this purpose, each of the blades is cut away as at 26 to form an opening for admitting the light at three eccentric points as soon as the blades move the openings 26 past the ends of the adjacent blades. This occurs as soon as the blades have moved sufficiently to cause an opening at the center and continues until the blades have moved sufficiently to bring the openings 26 outside the periphery of the aperture. While I show the blades formed with the openings 26, the same result may be accomplished by cutting out that part of the blade inside the opening 26 or by making the blades of other forms, at present, I prefer the form illustrated for the reason that it does not weaken the blade to any extent and the blades of the form shown completely exclude the light at the center of the aperture when in closed position. The blade 22 has the slot 29 formed therein by means of which the blade is connected with the blade operating member hereinafter more fully described. An auxiliary blade 30 of thin material is pivoted to the blade 22 at 27 and adjacent its opposite end is slotted as at 30$^a$ to receive a pin 31 secured in the blade 24 and operatively connects the blade 24 with the blade 22 so that as the blade 22 is moved from the closed position shown in Fig. 28 to the open position in Fig. 32 the blade 24 is also moved simultaneously from its closed to its open position. A second auxiliary blade 32 is pivoted at 28 to the blade 22 and to the blade 23 at 33 and operatively connects the blade 23 to the blade 22 to open and close the blade 23 simultaneously with the opening and closing movements of the blade 22. The blade 32 is provided with the arcuate slot 34 to provide a clearance for the pivot 25 of the blade 23. The auxiliary blade 30 is also slotted at 35 to provide a clearance for the pivot 25 of the blade 24 which engages the auxiliary blade to guide it downwardly and outwardly as the blades are opened. The auxiliary blades may be made of thin material and when the shutter is closed as shown in Fig. 28 overlie the margins of the aperture at the weak points where the primary blades overlap each other. For this purpose, the auxiliary blade 30 is provided with a tail piece 36 and the auxiliary blade 32 with the tail piece 37, to cooperate with the blades 22 and 23, and 23 and 24 respectively. This construction enables me to employ a much narrower blade than has heretofore been possible, making possible the construction of a high grade shutter of a size sufficiently small to be used on small hand cameras without reducing the diameter of the lens aperture. The flexibility of the auxiliary blades also serves to take up the lost motion in the operation of the primary blades and effectively prevents rebound. Pivotally mounted on the partition 21 is the blade operating member or device 38, having a lug or pin 39 projecting through a slot or opening in the partition 21 and into the slot 29 of the blade 22. I have shown the blade operating member in the present embodiment mounted on antifriction or ball bearings to avoid wear and insure a smooth rapid movement in the opening and closing movements of the blades. To this end the member 38 is counterbored to receive a collar 40 which is threaded into it, see Fig. 20. A collar 41 overlies the outer edge of the member 38 and is fixed to the partition 21 by means of the screws or studs 42. A ball race for the antifriction balls 43 being formed between the fixed collar 41 and the movable member 38. A sleeve 40$^a$ is threaded into the collar 40 and has a central aperture which receives the pin 40$^b$. An arm 44 on the member 38 projects laterally therefrom and has a member 45 fixedly secured thereto by means of screws or otherwise. The member 45 extends inwardly over the fixed collar 42 and the movable collar 43 is provided with the pin 40$^a$ and at its inner end is provided with the lug or projection 46 eccentric to the blade operating member and adapted to be engaged by devices presently to be described to open and close the shutter blades.

Pivoted to the partition 21 is a master member 47 adapted to actuate the blade operating member and also to cooperate with retarding devices for accurately and automatically controlling the interval of time between the opening and closing movements of the shutter blades for automatically timed exposures. The master member is also preferably mounted on antifriction or ball bearings to illuminate wear and permit it to be operated smoothly at very rapid speeds. For this purpose the master member comprises a collar 48 cooperating with antifriction members or balls 49 in a groove or race provided therefor between the member 48 and a stud or post 50 fixed to the partition 21 and on which the master member has a limited turning movement. Formed integral with the collar 48 is a lug or projection 51 which normally engages the inner wall of the casing when the master member occupies the position shown in Fig. 5 in which the blades are closed. A master or motor spring 52 is coiled about a fixed post 53 and engages a lug or projection 54 on the master member to hold it in normal position with the lug 51 engaging the inner wall of the casing. Secured to the collar 48 by screws or otherwise is an arcuate arm 55 extending around the casing and adapted to engage or cooperate with the retarding devices hereinafter described. A laterally and downwardly projection finger 56 is formed integral with the arm 55 and is adapted to cooperate with devices for operating the blade actuating member. The master member is actuated against the tension of its spring 52 by devices hereinafter described.

Pivoted to the member 45 by means of a shouldered screw or otherwise is a locking member or dog 57 normally adapted to engage a fixed pin or lug 58 or when moved on its pivot to be disengaged from the fixed pin and to engage the projection 55 to move the blade actuating member to open the blades. A spring 59 maintains the dog 57 in normal position to engage the pin 58 and lock the blade actuating member against movement to maintain the blades in closed position until the opening movement for an exposure is about to take place. When the master member is operated from the position shown in Fig. 5 to open the blades, the finger 56 engages a tail member 60 on the dog which is moved against the action of its spring until the finger 56 passes the dog which is returned to normal position by its spring. During this movement the dog is not moved sufficiently to be disengaged from the lug 58 to unlock the blades. After the master member has moved past the dog 57, it is released from its operating devices and returned toward its normal position under the action of its spring 52. During its return movement the finger 56 on the master member again engages the dog 57 and moves it in the opposite direction against the action of its spring until it passes or disengages the pin 58 and releases the blade actuating member so that the blades are free to move to open position. As soon as the dog 57 has moved sufficiently to release the blade actuating member, the dog 57 engages the lug 46 on said member and turns it to open the blades as previously described. The engagement between the finger 56 and the tail 60 of the dog 57 is maintained until the closing movement of the blade actuating member takes place. When the master member has moved sufficiently to open the blades, further movement in the same direction operates to again move the blade actuating member in the opposite direction to normal position to again close the shutter blades. For this purpose the arm 55 of the master member is provided with a lug or projection 61 in position to engage the opposite side of the lug 46 and upon continued movement of the master member moves the blade actuating member to normal position to close the blades. By means of the construction illustrated and described, I have provided means for locking the blades and maintaining them locked while in closed position, moreover the parts co-operating to actuate the blade actuating member are so arranged and mounted that the opening and closing movements of the blades take place in the shortest possible interval of time. I also provide means for preventing fouling or the actuation of the operating devices with a "click" without producing an exposure resulting in the loss of both the sensitive plate and the picture. For this purpose, the finger 56 is cut away slightly as at 62 to form a notch in which the end of the dog 57 is adapted to engage when the finger 56 moves opposite the end of the dog and holds or locks the parts in this position by reason of the arrangement the pin 58 and the pivoted centers of the dog and the master member thus preventing the return of the master member without operating the blade actuating member to produce an exposure. Further actuation of the master member releases it from the dog and permits it to return under the action of its spring to make an exposure in the usual manner.

A trigger 63 is pivoted to the partition 21 and operatively connected with the master member. The trigger is preferably mounted on antifriction or ball bearings to prevent wear and enable it to be operated smoothly at high speed. To this end a pin 64 Fig. 21 is fixed in the partition and a thrust bearing 65 serves to space a disk 66 from the partition. The disk 66 has a ball race in its outer periphery adapted to receive the balls 67 which cooperate with a similar groove or race in the inner periphery of a ring 68 formed on the inner end of the trigger. The trigger projects outwardly through a slot in the casing wall and has a finger piece by which it may be manually operated. A bracket 69 may be secured to the outer wall of the casing adjacent the trigger having an upturned end 70 forming a thumb rest when the trigger is operated and thus avoiding the danger of jarring the shutter when operating it manually. The oppositive end of the bracket is also upturned as at 71 and tapped to receive the usual cable release. A socket or opening 72 is formed in the trigger with which the end of the cable cooperates to actuate the trigger. In its normal position, the trigger occupies a position adjacent the end 71 of the bracket and during operation moves toward the portion 70 thereof.

A contractile coil spring 73 is connected with the trigger and anchored to a post 74 fixed to the partition and tends to maintain the trigger in its normal position shown in Fig. 5. Projecting from the face of the trigger is a lug or pin 75 which projects into a slot 76 provided therefor adjacent the end of a link or connecting member 77 pivoted to the master member by means of the shouldered screw 78. The slot 76 is of the form shown in the drawings having its upper end formed with substantially parallel sides slightly inclined and its lower end offset thereto and slightly enlarged, forming shoulders 79 and 80. A substantially L shaped slot 81 is also formed in the link 77 and a screw or pin 82 substantially concentric with the pivot of the trigger projects into this slot and serves to guide or control the movement of the upper end of the link. When the trigger is moved from the position shown in Fig. 5 the lug 75 engages the shoulder 79 and moves the link 77 to the position shown in Fig. 6, at which point the pin 76 rides off the shoulder 79 and into the upper end of the slot as the link 77 is moved downwardly under the action of the motor spring 52, and the blade actuating member is actuated to operate the blades. The stud 82 cooperates with the edges of the slot 81 in the link 77 to limit and guide the movements of the link. A spring 83 is secured to the link and engages a lug or pin 84 fixed to the position and tends to maintain the link in its normal position with the lug 82 to the right of its slot. When the trigger is released its spring 73 returns it to normal position, during which movement the link 77 turns on its pivot without actuating the master member and permits the pin 75 to return to normal position in contact with the shoulder 79 as seen in Fig. 5 of the drawings.

The parts thus far described, provide a shutter operating automatically since a single movement of the trigger or of the cable release to move the trigger first sets the master member and then releases it for an automatic exposure of instantaneous duration the duration of which depends mainly on the strength of the master or motor spring 52.

I have also provided means for securing accurately timed automatic exposures of greater duration, and also the so called "bulb" and "time" exposures. To this end, I employ a retarding device of novel construction adapted to be assembled as a unit before being placed in the shutter casing and adapted to cooperate with the arm 55 of the master member to delay its movement to close the shutter blades at the instant it has moved to open them. These retarding devices are particularly illustrated in Figs. 7 to 16 of the drawings and comprise a plate or support 85 adapted to be secured in position to the partition 21 in the casing by means of screws or other suitable means. The plate 85 has an opening adjacent one end in which is received a cylinder or dash pot 86 which normally rests on the partition 21 and has a flange 87 engaging the bottom of the plate 85. Movable in the cylinder or dash pot 86 and closely fitted therein is as piston 88 open at its outer end and serving as a combined piston cooperating with the dash pot 86 and a cylinder or dash pot with which a piston 89 cooperates. The plate 85 is provided with a pair of upstanding flanges 90 which are apertured to receive the pivot pins 91 and 92. Pivoted on the pin 91 is a lever 93 apertured to move freely over the dash pot or cylinder 86 and provided with inwardly projecting pins or trunnions 94 adapted to engage at diametrically opposite points in a groove 95 formed in the outer wall of the combined cylinder and piston 88 adjacent its outer end. A spring 96 coiled about the pivot 91 is anchored against the plate 85 and engages the lever 93 and tends to move it in a direction to withdraw the combined cylinder and piston 88 from the cylinder 86. The walls of the cylinder 86 are cut away as at 97 at diametrically opposite points to provide a clearance for the trunnions 94 when the lever 93 is moved to thrust its piston 88 into the cylinder 86. The lever 93 is also provided with an upstanding post or projection 98 adapted to cooperate with the setting devices 99 hereinafter more fully described. A second lever 100 is pivoted on the pin 92 and extends upwardly and horizontally over the piston 89 and then downwardly and again horizontally and is adapted to move on its pivot through the opening in the lever 93 independently of any movement of the latter lever. The lever 100 is also apertured at 101 to provide a clearance for the post 98 on the lever 93. An upstanding post 102 is provided on the lever 100 for cooperation with the setting devices and a spring 103 associated with the pivot of the lever is anchored against the plate 85 and engages the lever to maintain it in normal position with the post 102 in engagement with the setting devices. An arm or projection 104 is bent up from the material of the lever 100 and extends into the piston 89 where it is provided with an offset lip 105 which engages beneath an inverted U shaped retaining member 106 secured to the bottom wall of the piston and serves to operatively connect the piston with the lever. The retarding devices as above described may be assembled as a unit on the plate 85 and then secured in position to the partition 21 in the shutter casing.

Adjustable means are provided for operatively connecting the master member with the retarding device for controlling the action of the master or motor spring for securing automatically timed exposures. To this end a plate 107 is pivoted to the partition 21 by means of a shouldered screw 108 adjacent the end of the arm 55 of the master member. The end of the plate 107 is provided with a pair of upstanding flanges 109 in which is pivoted a lever 110 having a curved arm 111 extending beyond the plate 107 and adapted to cooperate with the levers 93 and 100 when the plate 107 is properly adjusted. The other arm of the lever 110 is provided with an abutment 112 adapted to be engaged by an arm 113 pivoted to a pin or post 114 fixed in the partition 21. The arm 113 is adapted to be engaged by the arm 55 of the master member which moves it in one direction to operate the lever 110 and a spring 115 engages the arm to move it in the opposite direction and normally maintains it in contact with the abutment 112 of the lever 110. A spring 116 is coiled about the pivot of the lever 110 and actuates said lever toward the arm 113 which is held in the normal position shown in Fig. 14 by the engagement of a projection 117 on the lever with the plate 107.

The adjustment of the plate 107, the levers 93 and 100 and the time and bulb levers hereinafter described is accomplished by means of setting devices of novel construction. Fixed in the partition 21 is a post 118 on which is rotatably mounted a sleeve 119 having a knurled finger piece 120 at its outer end. The outer or front face of the finger piece is provided with a scale bearing the usual indices T, B, 1, 2, 5, 10, 25, 50, 100, and 200, indicating the exposures time, bulb, 1 second, 1/2 second, 1/5 second, 1/10 second, 1/25 second, 1/50 second etc. A pointer 121 is fixed to the post 118 adjacent the outer face of the finger piece to cooperate with the scale and serve as a thrust bearing for the sleeve. Fixed on or formed integral with the sleeve 119 are the lever setting devices having the stepped portion 123, 124, 125 and 126 adapted to engage the post 98 and set the lever 93 and with it the combined cylinder and piston 88 for exposures of variable duration as hereinafter fully explained. The devices also have the stepped portions 127, 128, 129, 130 and 131 arranged at a greater radial distance from the axis of the sleeve and cooperating with the post 102 of the lever 100 for adjusting said lever and with it the piston 89 for obtaining automatic exposures of shorter duration. Means are also provided for adjusting the member 107 about its pivot 108 by the setting devices, to move the lever 110 carried thereby from a position to engage the lever 100 above for the automatic exposures of short duration to a position to engage both the levers 100 and 93 for automatic exposures of longer duration and from the latter position to a position to engage the lever 93 alone for automatic exposures of the longest duration. For this purpose, I provide a lever 132 centrally apertured and swiveled on the outer wall of the cylinder 86 in contact with the plate 85 and having the arm 133 extending to a point adjacent the setting devices and the arm 134 extending in an opposite direction to a point where it engages the member 107 which is held in contact therewith by means of a spring 135 secured thereto and anchored between the inner wall of the casing and a lug 136 fixed to the partition 21. If desired, the plate 85 may be provided with a flange 137 having a slot through which the arm 134 extends and which serves as a guide to steady the movements of the lever 132. The arm 133 of the lever 132 is provided with the lateral projections 138 and 139 the latter of which is adapted to cooperate with a projection or extension 140 on the sleeve 119 of the setting devices, being held in contact therewith by the action of the spring 135 of the member 107 which engages the lever 132 and tends to move the arm 133 toward the sleeve 119. The flange 90 of the plate 85 is slotted and the arm 133 and projection 138 project into this slot to insure accurate movement of the lever 132 and maintain it in proper position on the cylinder in contact with the plate 85. With the parts adjusted as shown in Fig. 7 the setting devices are set for an automatic exposure of longest duration which the shutter illustrated herein is intended to make, in the present instance one second. In this position the point "1" of the scale on the finger piece cooperates with the pointer 121 as shown in Fig. 1 and the projection 140 on the sleeve cooperates with the lever 132 to hold it in the position in which the arm 111 of the lever 110 cooperates with the lever 93. At the same time the posts 98 and 102 cooperate directly with the under face of the finger piece 120 permitting the levers 93 and 100 to move to their full extent under the action of the springs 93 and 103 and the combined cylinder and piston to its fullest extent from the cylinder 86 with its bottom wall against the bottom of the piston 89 as seen in Figs. 10 and 11. If now the trigger is actuated to operate the master member to cause an exposure as previously described, the finger 56 first engages the dog 57 to unlock the shutter actuating member and actuates it to open the shutter blades, at this instant the lug 61 on the arm 55 engages the lug 46 to return the blade actuating member to close the shutter but the arm engages the retarding devices which prevent the free movement of the master member to close the shutter blades until the retarding device has been actuated. To this end, the end of the arm 55 of the master member has a downwardly projecting lug 141 in position to engage the arm 113 when the master member is actuated. As the master member moves from its normal position in Fig. 5 to "set" position Fig. 6 the lug 141 moves the arm 113 idly against the action of its spring but when moving in the opposite direction, it moves freely until the shutter blades have been opened as above described when the lug 141 again engages the arm 113 on its opposite side and through the arm swings the lever 110 against the action of its spring and the lever 93 associated with the combined cylinder and piston 88 and actuates said lever from the position shown in Fig. 11 to that shown in Fig. 12, at which time the lug 141 moves off the end of the arm 113 and permits the motor spring to move the master member to close the shutter blades. It will be noted that in its movement from the Fig. 11 position to that shown in Fig. 12 the lever 93 moves the cylinder 88 against the action of the piston 89 and also against the action of the cylinder 86 resulting in a retarding action on the master member equivalent to the combined retarding capacity of the cylinders 86 and 88. It will be understood that the maximum retarding action can readily be increased by increasing the capacities of the cylinders 86 and 88. To secure shorter exposures it is necessary to utilize only a proportional part of the capacity of the cylinders 86 and 88 and for the shortest exposures to eliminate their action altogether. By moving the finger piece 120 to bring the point "2" of its scale to the pointer for an exposure of 1/2 second, the lever 110 remains in position indicated for one second, but a stepped portion 125 or cam 126 of the setting devices engages the post 98 on the lever 93 and depresses said lever from the position shown in Fig. 11, to limit the movement of the post 98 outwardly toward the finger piece 120 and depressing the combined cylinder and piston 88 and limiting its stroke with the result that only a part of the full capacity of the retarding devices now employed, resulting in the present instance in an exposure of 1/2 second. If the finger piece is further rotated to bring the index "5" of the scale under the pointer a second stepped portion engages the post 98 and further depresses the lever 93, a stepped portion also engages the post 102 and depresses the lever 100 until its outer end is moved into the place of the outer end of the lever 93, at this time the projection 140 is also moved to permit the spring 135 to move the lever 110 to a position where it engages both levers 93 and 100. In this position of the parts the piston 89 rests on the bottom of the cylinder 88 and the lever 110 engages and operates both levers 93 and 100 simultaneously utilizing only a small part of the retarding capacity of the cylinder 86 resulting in the present instance in an exposure of 1/5 of a second. Still further rotation of the finger piece 120, until the index "10" cooperates with the pointer for an exposure of 1/10th of a second, releases the lever 100 from its stepped member and permits it to return to its outer position shown in Fig. 12 of the drawings. The lever 93 is further depressed to its full extent by the cooperation of the stepped portion or cam member 124 with its post 98 and the projection 140 disengages the lever 133 and permits the spring 135 to move the lever 110 to a position to engage the lever 100 along in which position it operates independently of the lever 93. It will be noted that in this position of the parts the retarding action of the small cylinder 88 and piston 89 are along utilized and with the capacity of the parts, as illustrated, results in an exposure of 1/10th of a second. Still further movement of the finger piece 120 brings the index "25" under the pointer for an exposure of 1/25th of a second. As the finger piece is moved to this position the levers 93 and 100 remain stationary the latter being in position to engage the lever 100 which is depressed from the position shown in Fig. 12 in which the parts are adjusted for an exposure of 1/10th of a second by the cooperation of the stepped portion or cam 131 with the post 102 of the lever 100. In this position of the parts the retarding action is limited to a portion of the capacity of the small cylinder 88 and in the present instance results in an exposure of 1/25th of a second. Further rotation of the finger piece 120 to bring the index "50" thereon into cooperation with the pointer to adjust the parts for an exposure of 1/50th of a second, causes the stepped portion 130 of the setting devices to further depress the lever 100 to limit its movement still further until an exposure of the desired time 1/50th of a second is obtained. Still further movement of the finger piece 120 to bring the index "100" thereon into cooperation with the pointer for an exposure of 1/100th of a second, causes the stepped or cam portion 129 to engage the post 102 to still further depress the lever 100 reducing the retarding action of the cylinder 88 to a small fraction only of its capacity, resulting in the desired exposure. It will be understood that during these last setting operations the levers 110 and 93 remain stationary, the former being in position to engage the lever 100 and the latter being depressed to its limit to eliminate the retarding action of the cylinder 86. It will also be noted that I have provided a retarding device comprising a plurality of cylinders and pistons of different capacities in which the full capacity of all the cylinders is utilized for automatic exposures of longer duration, the full and fractional parts of the capacity of the larger cylinder being utilized for exposures of intermediate length or duration, and the full and fractional parts of the capacity of the smaller piston being utilized for automatic exposures of shorter duration, the retarding action being entirely eliminated for an exposure of the shortest duration as when the finger piece is moved to bring its index "200" for an exposure of 1/200th of a second into cooperation with the pointer, the portion 128 of the setting devices, again engages the post 102 and moves the parts to the position shown in Fig. 13 in which the levers 93 and 100 are both depressed to their limit and the lever 110 is free to swing on its pivot without actuating either of them or appreciably retarding the movement of the master member.

I have also provided means for securing what is known as "time" and "bulb" exposures. When the finger piece 120 is turned from the position last described and with the parts as illustrated in Fig. 13 to bring the indexes "T" for a "time" exposure and "B" for "bulb" exposure into cooperation with the pointer the posts 98 and 102 rest on the parts 124 and 128 respectively and maintain the levers 98 and 100 depressed as shown in said figure. The lug 140 is not moved sufficiently to engage the projection 139 and hence, the lever 110 is not moved from said position. As a result the retarding devices are inactive during "time" and "bulb" exposures as in the 1/200th of a second exposure. Figs. 2, 3 and 5 show the parts set for a "time" exposure. In Fig. 2 the trigger is depressed and the blades open, Fig. 3 shows the trigger released and the blades locked or held in open position, and Fig. 5 shows the blades closed and the parts "set" for a time exposure. In order to secure the time exposure or to lock the blades in open position after an actuation of the trigger to open them, I employ a time lever 142 pivoted on a shouldered screw 143 to the partition 21. The lever 142 has an inwardly and upwardly extending arm 144 normally resting on a cylindrical member 145 of the setting devices when the shutter is set for the automatically timed exposures, as shown in Fig. 6. Arranged at nearly right angles to the arm 144 is a second arm 146 having an inwardly projecting hook 147. A spring 148 is coiled about a post fixed to the partition 21 and anchored against a lug 149 on the partition 21 engages the lever 142 and tends to move its arm 144 toward the setting devices. A bulb lever 149 is pivoted on a shouldered screw 150 on the partition 21 and cooperates with the time lever for making a time exposure. The bulb lever has an upwardly and inwardly extending arm 151 adapted to cooperate with a semi cylindrical member 152 on the sleeve of the setting devices. When the setting devices are set for automatically timed exposures the member 152 engages the arm 151 as shown in Fig. 6 and swings the arm on its pivot against the action of its spring 153 secured to the arm and engaging the inner wall of the casing. In the position shown in Fig. 6 both the time and bulb levers are idle or inactive. When the finger piece 120 is turned to bring the index "B" under the pointer for a bulb exposure the member 152 disengages the arm 151 which is moved against the post 118 under the action of its spring 153. The bulb lever is also provided with a curved arm 154 which extends downwardly and inwardly from its pivot to a point adjacent the lower end of the slot 81 in the link 77 adjacent the outer surface of which the arm 154 lies. At its inner end the arm 154 has a cut away portion 155 adapted to cooperate with a lug or projection 156 adjacent the lower end of the slot 81 on the link 77, with the parts set for a bulb exposure as shown in Fig. 4 and the trigger depressed the master member is actuated as usual on the downward stroke of the trigger to set the master member. During the movement of the link 77 under the action of the trigger the lug 156 engages the end of the arm 154 and swings the bulb lever idly against the action of its spring until the lug passes the arm 154 when the spring returns the arm to a position below the lug. When the lug or pin 76 passes off the shoulder 79 the master member returns sufficiently to open the blades at which time the lug 156 engages the cut out portion 155 of the bulb lever which arrests the movement of the link 77 and the master member, maintaining the blades in an open position while the trigger is depressed. When the trigger is released and returns to normal position under the action of its spring the lug 76 engages the side of the slot and swings the link on the master member sufficiently to disengage the lug 156 from the bulb lever and permits the return of the master member to close the blades.

When the finger piece 120 is turned to bring the index "T" on its scale to the pointer, the bulb lever still occupies the position just described for a bulb exposure but the cylindrical portion 145 of the setting devices occupies the position shown in Figs. 2 and 3 in which a cut away portion thereof is brought under the arm 141 of the time lever permitting its spring to move the arm toward the axis of the member 145 and the arm 146 toward the link 77. When the trigger is now depressed for an exposure the lug 156 again engages the bulb lever as previously described when the parts have moved to open the blades, when however the trigger is released, the hook 147 engages a lug or projection 157 on the link 77 before the lug 156 on the link 77 is entirely released from the bulb lever and locks or holds the master member in position with the blades open, while the trigger is free to return to normal position under the action of its spring as shown in Fig. 3. It will be noted that I have provided a shutter in which the trigger is free to return completely to normal position when the blades are open for a time exposure, thus preventing liability of displacing the cable release as would be the case if the trigger were brought to rest some distance from the projection 71. A second actuation of the trigger causes the pin 76 to engage the outer side of the slot in the link 77 to swing the link on its pivot and withdrawn the lug 157 from the time lever. This operation releases the link 77 and permits the return of the master member under the action of its motor spring to close the shutter blades. The finger piece 120 of the setting devices is at all times free to be turned either to the right or left to adjust the parts of the shutter for any required exposure without danger of disarranging the parts or getting them out of order. For this purpose, the posts 98 and 102 have rounded or spherical engaging portions cooperating with the comparatively short steps of the setting devices, and the time and bulb levers engage the setting devices with a wiping action which does not interfere with the free rotation of the finger piece in either direction.

Having described my invention, what I claim and desire to secure by Letters Patent is;

1. In a shutter, the combination of a casing having an aperture therethrough, a plurality of blades pivoted in said casing for opening and closing said aperture, said blades being provided with openings adapted to admit light from a plurality of marginal openings simultaneously with the admission of light from the center opening while the light is obstructed in a ring around the center opening during the opening and closing movements of the blades, and means for opening and closing the blades.

2. In a shutter, the combination of a casing having an aperture there through, a plurality of blades movably mounted in said casing for opening and closing said aperture, each of said blades having an opening for admitting light from the margin of the aperture simultaneously with the admission of light from the center thereof during the opening and closing movements of the blades, and means for moving the blades.

3. In a shutter, the combination of a casing having an aperture there through, a plurality of blades pivoted in said casing for opening and closing said aperture, a plurality of auxiliary blades connecting said blades for causing them to move simultaneously, and means operatively connected with one of said blades for moving it.

4. In a shutter, the combination of a casing having an aperture there through, a plurality of blades pivoted in said casing for opening and closing said aperture, a plurality of auxiliary blades connecting said blades for causing them to move simultaneously and cooperating therewith to present the admission of reflected light through the aperture when the blades are in closed position, and means operatively connected with one of said blades for moving it.

5. In a shutter, the combination of a casing having an aperture there through, a plurality of blades pivoted in said casing for opening and closing said aperture, a plurality of auxiliary blades connecting said blades for causing them to move simultaneously, tail members on said auxiliary blades adapted to cooperate with the primary blades to exclude reflected light from the aperture when the blades are in closed position, and means operatively connected with one of said blades for moving it.

6. In a shutter, the combination of a casing having an aperture there through, a plurality of blades pivoted in said casing for opening and closing said aperture, auxiliary blades pivoted to one of said blades for operatively connecting said blade with the other blades, means on said auxiliary blades adapted to cooperate with said blades to exclude reflected light from the aperture when the blades are in closed position, and means operatively connected with one of said blades for moving it.

7. In a shutter, the combination of a casing having an aperture there through, a plurality of blades movably mounted in said casing for opening and closing said aperture, a blade operating member pivotally mounted in said casing and operatively connected with said blades, a master member operatively engaging said blade operating member, a motor spring for actuating the master member, a trigger, and a link operatively connecting the trigger with the master member for tensioning the motor spring, said link being automatically released from the trigger to permit the spring to actuate the master member.

8. In a shutter, the combination of a casing having an aperture there through, a plurality of blades movably mounted in said casing for opening and closing said aperture, a blade operating member pivotally mounted in said casing and operatively connected with said blades, a master member operatively engaging said blade operating member, a motor spring for actuating the master member, antifriction bearings for said blade actuating member and master member, and a trigger for operating the master member.

9. In a shutter, the combination of a casing having an aperture there through, a plurality of blades movably mounted in said casing for opening and closing said aperture, a blade operating member pivotally mounted in said casing and operatively connected with said blades, a master member operatively connected with the blade operating member, and a trigger pivoted in said casing and operatively connected with the master member, said blade operating member, master member and trigger all being mounted on antifriction bearings to enable them to be operated quickly at high speed.

10. In a shutter, the combination of a casing having an aperture there through, a plurality of blades movably mounted in said casing for opening and closing said aperture, a blade operating member pivotally mounted in said casing and operatively connected with said blades, a master member operatively connected with said blades, a motor spring for actuating the master member, a trigger pivoted in said casing, a link pivoted to the master member, and a pin and slot connection between the link and the trigger adapted to connect the link to the trigger to tension the motor spring and automatically release the link from the trigger to permit the spring to actuate the master member.

11. In a shutter, the combination of a casing having an aperture there through, a plurality of blades movably mounted in said casing for opening and closing said aperture, a blade operating member pivotally mounted in said casing and operatively connected with said blades, a master member operatively connected with said blades, a motor spring for actuating the master member, a trigger pivoted in said casing, a link pivoted to the master member, having a substantially L shaped slot and a projection on said trigger in said slot adapted to operatively connect the link with said trigger, the construction being such that the pin first engages the shoulder in the slot to actuate the link to tension the motor spring when it rides off the shoulder and permits said spring to actuate the master member.

12. In a shutter, the combination of a casing having an aperture there through, a plurality of blades movably mounted in said casing for opening and closing said aperture, a blade operating member pivotally mounted in said casing and operatively connected with said blades, a master member operatively engaging said blade operating member, a motor spring for actuating the master member, a trigger pivoted in said casing, a link pivoted to the master member, means on said trigger adapted to operatively connect the link with said trigger, the construction being such that actuation of the trigger actuates the master member to tension the motor spring when the link is automatically released to permit the master member to actuate the shutter blades, and a spring for returning the trigger, to normal position.

13. In a shutter, the combination of a casing having an aperture there through, a plurality of blades movably mounted in said casing for opening and closing said aperture, a blade operating member pivotally mounted in said casing and operatively connected with said blades, a master member operatively engaging said blade operating member, a motor spring for actuating the master member, a trigger, a link operatively connecting the trigger with the master member, and means cooperating with said link to arrest the movement of the master member to close the blades while the trigger is depressed.

14. In a shutter, the combination of a casing having an aperture there through, a plurality of blades movably mounted in said casing for opening and closing said aperture, a blade operating member pivotally mounted in said casing and operatively connected with said blades, a master member operatively engaging said blade operating member, a motor spring for actuating the master member, a trigger, a link operatively connecting the trigger with the master member, a bulb lever cooperating with said link to arrest the movement of the master member to close the blades while the trigger is depressed, and means for moving the bulb lever to inoperative position.

15. In a shutter, the combination of a casing having an aperture there through, a plurality of blades movably mounted in said casing for opening and closing said aperture, a blade operating member pivotally mounted in said casing and operatively connected with said blades, a master member operatively engaging said blade operating member, a motor spring for actuating the master member, a trigger, a link operatively connecting the trigger with the master member, a bulb lever having an arm adapted to cooperate with the link to arrest the movement of the master member to close the blades while the trigger is depressed, and setting devices operatively engaging the other arm of the bulb lever for moving said lever to an inoperative position.

16. In a shutter, the combination of a casing having an aperture there through, a plurality of blades movably mounted in said casing for opening and closing said aperture, a blade operating member pivotally mounted in said casing and operatively connected with said blades, a master member operatively engaging said blade operating member, a motor spring for actuating the master member, a trigger, a link operatively connecting the trigger with the master member, setting devices, and a bulb lever cooperating with the link to arrest the movement of the master member to close the blades while the trigger is depressed, and having a wiping engagement with the setting devices to permit free movement thereof in either direction.

17. In a shutter, the combination of a casing having an aperture there through, a plurality of blades movably mounted in said casing for opening and closing said aperture, a blade operating member pivotally mounted in said casing and operatively connected with said blades, a master member operatively engaging said blade operating member, a motor spring for actuating the master member, a trigger, a link operatively connecting the trigger with the master member, a lug on said link, a bulb lever adapted to engage said lug, and a spring for holding said bulb lever in operative position, the construction being such that when the trigger is depressed, the lug engages the lever and moves it idly from its path but on the return movement of the link engages the lug to arrest the master member before the blade operating member has been actuated to close the blades, the return movement of the trigger again moves the link to disengage the lug from the bulb lever and permits free movement of the master member to close the blades.

18. In a shutter, the combination of a casing having an aperture there through, a plurality of blades movably mounted in said casing for opening and closing said aperture, a blade operating member pivotally mounted in said casing and operatively engaging said blades, a master member operatively engaging said blade operating member, a motor spring for actuating the master member, a trigger, a link operatively connecting the trigger with the master member, the construction being such that actuation of the trigger first tensions the motor spring when the link is automatically released to permit the master member to move to open and close the blades, and means cooperating with the link to lock the master member against further movement when the blades are open, a second actuation of the trigger operating to release the link to permit further movement of the master member to close the blades.

19. In a shutter, the combination of a casing having an aperture there through, a plurality of blades movably mounted in said casing for opening and closing said aperture, a blade operating member pivotally mounted in said casing and operatively connected with said blades, a master member operatively engaging said blade operating member, a motor spring for actuating the master member, a trigger, a link operatively connecting the trigger with the master member, the construction being such that actuation of the trigger first tensions the motor spring when the link is automatically released to permit the master member to move to open and close the blades, a time lever adapted to engage the link and lock the master member against further movement when the blades are open and a bulb lever cooperating with the link to direct it into engagement with the time lever.

20. In a shutter, the combination of a casing having an aperture there through, a plurality of blades movably mounted in said casing for opening and closing said aperture, a blade operating member pivotally mounted in said casing and operatively connected with said blades, a master member operatively engaging said blade operating member, a motor spring for actuating the master member, a trigger, a link operatively connecting the trigger with the master member, the construction being such that actuation of the trigger first tensions the motor spring when the link is automatically released to permit the master member to move to open and close the blades, a time lever adapted to engage the link and lock the master member against further movement when the blades are open, a bulb lever cooperating with the link to direct it into engagement with the time lever, and setting devices for moving said levers to inoperative positions.

21. In a shutter, the combination of a casing having an aperture there through, a plurality of blades movably mounted in said casing for opening and closing said aperture, a blade operating member pivotally mounted in said casing and operatively connected with said blades, a master member operatively engaging said blade operating member, a motor spring for actuating the master member, a trigger, a link operatively connecting the trigger with the master member, the construction being such that actuation of the trigger first tensions the motor spring when the link is automatically released to permit the master member to move to open and close the blades, setting devices, a time lever adapted to engage the link and lock the master member against further movement when the blades are open and having a wiping engagement with the setting devices to permit free rotation thereof in either direction, and a bulb lever cooperating with the link to direct it into locking engagement with the time lever.

22. In a shutter, the combination of a casing having an aperture there through, a plurality of blades movably mounted in said casing for opening and closing said aperture, a blade operating member pivotally mounted in said casing and operatively connected with said blades, a master member operatively engaging said blade operating member, a motor spring for actuating the master member, a trigger, a link operatively connecting the trigger with the master member, the construction being such that actuation of the trigger first tensions the motor spring when the link is automatically released to permit the master member to move to open and close the blades, a time lever, a hook on the time lever adapted to engage the link and lock the master member against further movement when the blades are open, and a bulb lever cooperating with the link to direct it into engagement with the hook.

23. In a shutter, the combination of a casing having an aperture there through, a plurality of blades movably mounted in said casing for opening and closing said aperture, a blade operating member pivotally mounted in said casing and operatively connected with said blades, a master member operatively engaging said blade operating member, a motor spring for actuating the master member, a trigger, a link operatively connecting the trigger with the master member, the construction being such that actuation of the trigger first tensions the motor spring when the link is automatically released to permit the master member to move, to open and close the blades, a time lever, a hook on the time lever adapted to engage the link and lock the master member against further movement when the blades are open, setting devices cooperating with the time lever for moving the hook to inoperative position, and a bulb lever adapted to engage the link and direct it into engagement with the hook.

24. In a shutter, the combination of a casing having an aperture there through, a plurality of blades movable therein to open and close the aperture, a pivoted blade operating member operatively connected with the blades, a master member, a motor spring for actuating the master member, means operated by the master member under control of the motor spring for moving the blade operating member in two directions to open and close the blades, and means for tensioning the motor spring.

25. In a shutter, the combination of a casing having an aperture there through, a plurality of blades movable therein to open and close the aperture, a pivoted blade operating member operatively connected with the blades, a master member, a motor spring for actuating the master member, a lug fixed on the blade operating member, a dog pivoted on the blade operating member, and a finger on the master member adapted to swing the dog into engagement with the lug to move the blade operating member to open the blades.

26. In a shutter, the combination of a casing having an aperture there through, a plurality of blades movable therein to open and close the aperture, a pivoted blade operating member operatively connected with the blades, a master member, a motor spring for actuating the master member, a lug fixed on the blade operating member, a dog pivoted on the blade operating member, a finger on the master member adapted to move the dog into engagement with the lug to move the blade operating member to open the blades, and an arm on the master member adapted to engage the lug to move the blade operating member in the opposite direction to close the blades.

27. In a shutter, the combination of a casing having an aperture there through, a plurality of blades movable therein to open and close the aperture, a pivoted blade operating member operatively connected with the blades, a master member, a motor spring for actuating the master member, a lug fixed in the casing, a dog pivoted on the blade operating member, and normally engaging the fixed lug to lock the blade operating member against movement, a lug on the blade operating member and a finger on the master member adapted to engage the dog and move it out of engagement with the fixed lug to unlock the blade operating member and into engagement with the lug on the blade operating member to move the blade operating member to open the blades.

28. In a shutter, the combination of a casing having an aperture there through, a plurality of blades movable therein to open and close the aperture, a pivoted blade operating member operatively connected with the blades, a master member, a motor spring for actuating the master member, a lug fixed in the casing, a dog pivoted on the blade operating member and normally engaging the fixed lug to lock the blade operating member against movement, a lug on the blade operating member, and a finger on the master member adapted to engage the dog and move it idly out of its path without disengaging it from the fixed lug when the master member moves to tension the motor spring and to engage the dog when the master member returns under the action of the motor spring to move it out of engagement with the fixed lug and into engagement with the lug on the blade operating member to move the latter to open the blades.

29. In a shutter, the combination of a casing having an aperture there through, a plurality of blades movable therein to open and close the aperture, a pivoted blade operating member operatively connected with the blades, a master member, a motor spring for actuating the master member, a lug fixed in the casing, a dog pivoted on the blade operating member and normally engaging the fixed lug to lock the blade operating member against movement, a lug on the blade operating member, a finger on the master member adapted to engage the dog and move it idly out of its path without disengaging it from its fixed lug when the master moves to tension the motor spring and to disengage the dog when the master member returns under the action of its spring and move it out of engagement with the fixed lug and into engagement with the lug on the blade operating member to move the latter to open the blades, and a spring for holding the dog in normal position to engage the fixed lug.

30. In a shutter, the combination of a casing having an aperture there through, a plurality of blades movable therein to open and close the aperture, a pivoted blade operating member operatively connected with the blades, a master member, a motor spring for actuating the master member, a lug fixed in the casing, a dog pivoted on the blade operating member and normally engaging the fixed lug to lock the blade operating member against movement, a lug on the blade operating member, and means on the master member adapted to engage the dog and move it idly from its path without disengaging it from the fixed lug when the master member moves it one direction and to move the dog out of engagement with the fixed lug and into engagement with the lug on the blade operating member to move said member to open the blades when the master member moves in the opposite direction.

31. In a shutter, the combination of a casing having an aperture there through, a plurality of blades movable therein to open and close the aperture, a pivoted blade operating member operatively connected with the blades, a master member, a motor spring for actuating the master member, a lug fixed in the casing, a dog pivoted on the blade operating member, and normally engaging the fixed lug to lock the blade operating member against movement, a lug on the blade operating member, and means on the master member adapted to engage the dog and move it idly from its path when the master member moves in one direction and to move it out of engagement with the fixed lug and into engagement with the lug on the blade operating member to open the blades when it moves in the opposite direction, the relation of the fixed lug and the pivots of the dog and master member being such that when the master member stops before clearing the dog it is locked against returning to normal position by engaging the dog which in turn engages the fixed lug.

32. In a shutter, the combination of a casing having an aperture therethrough, a plurality of blades movable therein to open and close the aperture, a pivoted blade operating member operatively connected with the blades, a master member, a motor spring for actuating the master member, means on the master member for actuating the blade operating member to open and close the blades, and retarding devices for preventing the free movement of the master member to close the blades.

33. In a shutter, the combination of a casing having an aperture therethrough, blades movably mounted in the casing for opening and closing the aperture, a blade operating member for opening and closing the blades, a master member for actuating the blade operating member, a motor spring for the master member, a trigger operatively connected with the master member for tensioning the motor spring, and retarding devices operatively engaged by the master member during its movement to close the blades.

34. In a shutter, the combination of a casing having an aperture therethrough, blades movably mounted in the casing for opening and closing the aperture, a blade operating member for opening and closing the blades, a master member for actuating the blade operating member, a motor spring for the master member, a trigger operatively connected with the master member for tensioning the motor spring, an arm on the master member, retarding devices, and an arm pivoted in the shutter casing operatively engaging the retarding devices and engaged by the arm on the master member when the master member moves to close the shutter blades.

35. In a shutter, the combination of a casing having an aperture therethrough, blades movably mounted in the casing for opening and closing the aperture, a blade operating member for opening and closing the blades, a master member for actuating the blade operating member, a motor spring for the master member, a trigger operatively connected with the master member for tensioning the motor spring, retarding devices, an arm pivoted in the shutter casing and operatively engaging the retarding devices and an arm on the master member adapted to engage the pivoted arm and move it idly out of its path when the master member moves to tension the motor spring and to engage the pivoted arm to operate the retarding devices when the master member moves to close the shutter blades.

36. In a shutter, the combination of a casing having an aperture therethrough, blades for opening and closing the aperture, a master member for actuating the blades, and a retarding device cooperating with the master member and comprising a cylinder having its axis substantially parallel with the axis of the casing aperture and a piston cooperating with the cylinder.

37. In a shutter, the combination of a casing having an aperture therethrough, blades for opening and closing the aperture, a master member for actuating the blades, and a retarding device cooperating with the master member and comprising a combined cylinder and piston cooperating with a cylinder and a piston.

38. In a shutter, the combination of a casing having an aperture therethrough, blades for opening and closing the aperture, a master member for actuating the blades, and a retarding device cooperating with the master member and comprising a combined cylinder and piston, a piston cooperating therewith, and means for limiting the stroke of the piston in the cylinder.

39. In a shutter, the combination of a casing having an aperture therethrough, blades for opening and closing the aperture, a master member for actuating the blades, and a retarding device cooperating with the master member and comprising a combined cylinder and piston, a lever associated therewith, and setting devices for limiting the movement of the lever.

40. In a shutter, the combination of a casing having an aperture therethrough, blades for opening and closing the aperture, a master member for actuating the blades, and a retarding device cooperating with the master member and comprising a combined cylinder and piston, a lever associated therewith, setting devices, and a post on said lever having a portion adapted to engage said setting devices.

41. In a shutter, the combination of a casing having an aperture therethrough, blades for opening and closing the aperture, a master member for actuating the blades, and a retarding device cooperating with the master member and comprising a combined cylinder and piston, a piston cooperating therewith, a lever associated with said combined cylinder and piston, a lever associated with said piston and independent of said first named lever, and setting devices cooperating with said levers.

42. In a shutter, the combination of a casing having an aperture therethrough, blades for opening and closing the aperture, a master member for actuating the blades and a retarding device cooperating with the master member and comprising a cylinder, a piston cooperating therewith, a lever associated with the piston, a post on said lever, and setting devices engaging said post and adapted to depress the lever to limit the stroke of the piston.

43. In a shutter, the combination of a casing having an aperture therethrough, blades for opening and closing the aperture, a master member for actuating the blades, a lever operatively engaged by the master member, retarding devices operatively engaged by said lever and setting devices adapted to adjust said lever relatively to the retarding devices.

44. In a shutter, the combination of a casing having an aperture therethrough, blades for opening and closing the aperture, a master member for actuating the blades, a lever adapted to be operated by the master member, retarding devices comprising two independently movable levers and means for adjusting the first mentioned lever from a position to engage both of said retarding levers to a position to engage one only thereof.

45. In a shutter, the combination of a casing having an aperture therethrough, blades for opening and closing the aperture, a master member for actuating the blades, a lever adapted to be operated by the master member, retarding devices comprising a lever adapted to be engaged by said first mentioned lever, and means for adjusting said first mentioned lever out of engagement with the second lever.

46. In a shutter, the combination of a casing having an aperture therethrough, blades for opening and closing the aperture, a master member for actuating the blades, a lever adapted to be operated by the master member, retarding devices operatively engaged by said lever, a movable plate on which said lever is mounted, and means for moving said plate to vary the position of said lever relatively to the retarding devices.

47. In a shutter, the combination of a casing having an aperture therethrough, blades for opening and closing the aperture, a master member for actuating the blades, a lever adapted to be operated by the master member, retarding devices operatively engaged by said lever, a movable plate on which said lever is mounted, setting devices cooperating with the retarding devices, and means operatively engaging said movable plate and setting devices for moving said plate to vary the position of said lever relatively to the retarding devices.

48. In a shutter, the combination of a casing having an aperture therethrough, blades for opening and closing the aperture, a master member for actuating the blades, a lever adapted to be operated by the master member, retarding devices comprising a cylinder and a lever operatively engaged by said first mentioned lever, a pivoted plate on which said first mentioned lever is mounted, setting devices cooperating with the retarding devices, and a lever swiveled on said cylinder and operatively connecting said pivoted plate with the setting devices.

49. In a shutter, the combination of a casing having an aperture therethrough, blades for opening and closing the aperture, a master member for actuating the blades, a pivoted arm adapted to be engaged by the master member, a lever engaged by said arm, retarding devices operatively engaged by said lever, and setting devices cooperating with said retarding devices and adapted to vary the position of said lever relatively thereto.

50. A retarding device for a shutter comprising a supporting plate adapted to be secured in the shutter casing, a cylinder secured to the plate, a piston cooperating with said cylinder, and means associated with said piston and adapted to cooperate with the blade actuating devices of the shutter.

51. A retarding device for a shutter comprising a supporting plate, a cylinder secured in said plate, a piston in said cylinder and a lever pivoted to said plate, and operatively connected to said piston and adapted to be operated by the blade actuating devices of the shutter.

52. A retarding device for a shutter comprising a supporting plate, a cylinder secured in said plate, a piston in said cylinder, a lever pivoted to said plate and operatively connected to said piston and adapted to be operated by the blade actuating devices, and a spring for moving the lever to normally withdraw the piston from the cylinder.

53. A retarding device for a shutter comprising a supporting plate, a cylinder secured in said plate, a piston in said cylinder, a lever pivoted to said plate and operatively connected to said piston, and setting devices cooperating with said lever and adapted to limit the stroke of the piston.

54. A retarding device for a shutter comprising a supporting plate, a cylinder secured in said plate, a combined cylinder and piston in said cylinder, a piston in said combined cylinder and piston, and means for operatively connecting said combined cylinder and piston and piston with the blade actuating devices of the shutter.

55. A retarding device for a shutter comprising a supporting plate, a cylinder secured in said plate, a combined cylinder and piston in said cylinder, a piston in said combined cylinder and piston, and means for operatively connecting said piston with the blade actuating devices of the shutter.

56. A retarding device for a shutter comprising a supporting plate, a cylinder secured in said plate, a combined cylinder and piston in said cylinder, a piston in said combined cylinder and piston, and a lever operatively connected with said piston and adapted to be operatively engaged by the blade actuating devices of the shutter.

57. A retarding device for a shutter comprising a supporting plate, a cylinder secured in said plate, a combined cylinder and piston in said cylinder, a piston in said combined cylinder and piston, a lever operatively connected with said piston and adapted to be operatively engaged by the blade actuating devices of the shutter, and setting devices cooperating with said lever.

58. A retarding device for a shutter comprising a supporting plate, a cylinder secured in said plate, a combined cylinder and piston in said cylinder, a piston in said combined cylinder and piston, a lever operatively connected with said piston, a spring for moving the lever to withdraw the piston from the combined cylinder and piston, and means adapted to maintain the piston in a plurality of set positions relatively to the cylinder.

59. A retarding device for a shutter comprising a supporting plate, a cylinder secured in said plate, a combined cylinder and piston in said cylinder, a lever operatively connected therewith, a piston in said combined cylinder and piston, a lever operatively connected with said piston, and setting devices cooperating with said levers for independently adjusting the piston relatively to the combined cylinder and piston and the combined cylinder and piston relatively to its cylinder.

60. A retarding device for a shutter comprising a supporting plate, a cylinder secured in said plate, a combined cylinder and piston in said cylinder, a lever operatively connected therewith, a piston in said combined cylinder and piston, a lever operatively connected with said piston, an adjustable lever adapted to selectively engage said levers and operated by the blade actuating devices of the shutter, and means for adjusting said last named lever.

61. A retarding device for a shutter comprising a supporting plate, a cylinder secured in said plate, a combined cylinder and piston in said cylinder, a lever operatively connected therewith, a piston in said combined cylinder and piston, a lever operatively connected with said piston, an adjustable lever adapted to selectively engage said levers and operated by the blade actuating devices of the shutter, and a lever mounted on said cylinder for adjusting said adjustable lever.

62. A retarding device for a shutter comprising a supporting plate, a cylinder secured in said plate, a piston in said cylinder, a lever operatively connected with said piston, a lever adapted to engage said lever and operated by the blade actuating devices of the shutter, and means for moving said last named lever into and out of a position to engage said first named lever.

63. A retarding device for a shutter comprising a supporting plate, a cylinder secured in said plate, a combined cylinder and piston in said cylinder, a lever operatively engaging said combined cylinder and piston, a piston in said combined cylinder and piston, and means operated by the blade actuating devices of the shutter adapted to engage said lever.

64. A retarding device for a shutter comprising a supporting plate, a cylinder secured in said plate, a combined cylinder and piston in said cylinder, a lever operatively engaging said combined cylinder and piston, a piston in said combined cylinder and piston, a lever operated by the blade actuating devices of the shutter and adapted to engage said first named lever, and means for adjusting said last named lever into and out of engagement with said first named lever.

65. A retarding device for a shutter comprising a supporting plate, a cylinder secured in said plate, a combined cylinder and piston in said cylinder, a lever operatively engaging said combined cylinder and piston, a piston in said combined cylinder and piston, a lever operatively engaging said piston, a lever operated by the blade actuating devices of the shutter and adapted to engage the first named lever to actuate the combined cylinder and piston in its cylinder and against its piston in the combined cylinder and piston, and means for adjusting said lever.

66. A retarding device for a shutter comprising a supporting plate, a cylinder secured in said plate, a combined cylinder and piston in said cylinder, a lever operatively engaging said combined cylinder and piston, a piston in said combined cylinder and piston, a lever operatively engaging said piston, a lever operated by the blade actuating devices of the shutter and adapted to engage said first named lever to actuate the combined cylinder and piston in its cylinder and against the action of its piston, both said levers jointly to actuate the combined cylinder and piston in its cylinder, or the second named lever to actuate the piston in the combined cylinder and piston, and means for adjusting said lever.

67. A retarding device for a shutter comprising a supporting plate, a cylinder secured in said plate, a combined cylinder and piston in said cylinder, a lever operatively connected with said combined cylinder and piston, a piston in said combined cylinder and piston, a lever operatively connected with said piston, a lever operated by the blade actuating devices of the shutter and adjustable to engage both of said first named levers simultaneously or either independently of the other, and a single device operable to adjust said first named levers to limit the strokes of the combined cylinder and piston and the piston and the last named lever relatively thereto.

68. In an automatic shutter, the combination of a casing having an aperture therethrough, blades for opening and closing said aperture, a blade operating member operatively engaging said blades, a master member adapted to operate said blade operating member, and antifriction bearings for said master member.

69. In an automatic shutter, the combination of a casing having an aperture therethrough, blades for opening and closing said aperture, a blade operating member operatively engaging said blades, a master member adapted to operate said blade operating member, a trigger operatively connected with said master member, and antifriction bearings for said master member and trigger.

70. In an automatic shutter, the combination of a casing having an aperture therethrough, blades for opening and closing said aperture, a blade operating member operatively engaging said blades, a master member adapted to operate said blade operating member, a trigger operatively connected with said master member, and antifriction bearings for said blade operating member, said master member and said trigger.

71. In a shutter, the combination of a casing having an aperture therethrough, blades for opening and closing said aperture, a master member operatively connected with said blades, a pivotal trigger operatively connected with said master member, a finger-piece on said trigger projecting through a slot in said casing, a bracket secured to said casing adjacent said slot, and a thumb rest on said bracket.

72. In a shutter, the combination of a casing having an aperture therethrough, blades for opening and closing said aperture, a pivoted trigger operatively connected with said master member, a finger piece on said trigger projecting through a slot in said casing, a bracket secured to said casing adjacent said slot, and a cable release mounted on said bracket and adapted to engage the finger piece on the trigger.

73. In a shutter, the combination of a casing having an aperture therethrough, blades for opening and closing said aperture, a master member operatively connected with said blades, a pivoted trigger operatively connected with said master member, a finger piece on said trigger projecting through a slot in said casing, a bracket secured to said casing adjacent said slot, a cable release mounted on said bracket and adapted to engage the finger piece on the trigger, and means for returning the trigger to normal position adjacent the cable release after each actuation thereof.

74. A blade for a photographic shutter constructed of thin material having a cut out portion adapted to admit light from the margin of the lens opening during the opening and closing movements of the blade.

75. A blade for a photographic shutter constructed of thin material having an elongated aperture therethrough, adapted to admit light from the margin of the lens aperture during the opening and closing movements of the blade.

76. In a shutter, the combination of a casing having an aperture therethrough, a plurality of blades movable to open and close the aperture and having cut out portions, the construction being such that in the opening and closing movements of the blades light is admitted simultaneously from the center and margin of the aperture and obstructed in a ring between the center and marginal openings, and means for moving the blades.

77. In a shutter, the combination of a casing having an aperture therethrough, a plurality of overlapping blades movable in said casing to open and close the aperture and constructed to admit light simultaneously from the center and margin of the aperture, and means for moving said blades.

78. In a shutter, the combination of a casing having an aperture therethrough, a plurality of blades movably mounted in said casing to open and close said aperture and overlapping each other when the aperture is open, said blades being so constructed that light is admitted simultaneously from the center and margin of the aperture when they move to open or close the aperture, and means for moving said blades.

79. In a shutter, the combination of a casing having an aperture therethrough, a plurality of blades pivoted in said casing and movable to open and close said aperture, links connecting said blades for causing them to move simultaneously said links being constructed of thin flexible material to prevent rebound, and means operatively connected with one of said blades for moving it.

PAUL J. MARKS.